United States Patent [19]

Moran et al.

[11] Patent Number: 5,728,210
[45] Date of Patent: Mar. 17, 1998

[54] COMPOSITION AND METHOD TO CONTROL CEMENT SLURRY LOSS AND VISCOSITY

[75] Inventors: Larry K. Moran, Sealy; Landreth L. Moran, Chico, both of Tex.

[73] Assignee: Conoco Inc., Ponca City, Okla.

[21] Appl. No.: 639,133

[22] Filed: Apr. 26, 1996

Related U.S. Application Data

[63] Continuation-in-part of Ser. No. 581,090, Dec. 29, 1995, abandoned.

[51] Int. Cl.$^6$ .................................................... C04B 24/00
[52] U.S. Cl. .................... 106/823; 106/778; 106/781; 106/819; 106/802; 106/809; 106/815; 524/2; 524/650; 524/423
[58] Field of Search ........................ 106/724, 815, 106/772, 778, 781, 802, 809, 823, 819; 166/293, 294; 524/2, 650, 423, 563, 5

[56] References Cited

U.S. PATENT DOCUMENTS

| | | | |
|---|---|---|---|
| 2,576,955 | 12/1951 | Ludwig | 524/5 |
| 4,011,909 | 3/1977 | Adams et al. | 166/293 |
| 4,351,671 | 9/1982 | Rosenberg et al. | 106/804 |
| 4,569,395 | 2/1986 | Carpenter | 166/293 |
| 4,967,839 | 11/1990 | Carpenter et al. | 166/293 |
| 5,009,269 | 4/1991 | Moran et al. | 166/293 |
| 5,105,885 | 4/1992 | Bray et al. | 166/293 |
| 5,207,831 | 5/1993 | Cowan | 106/724 |

*Primary Examiner*—Michael Marcheschi
*Attorney, Agent, or Firm*—C. R. Schupbach; William D. Hall

[57] ABSTRACT

Powdered and liquid fluid loss additives are disclosed for use in cementing wellbores, particularly oil and gas wellbores. Excellent fluid loss control is achieved over a wide range of conditions using various cements systems. The invention utilizes polyvinyl acetate polymers as a fluid loss additive. The polyvinyl acetate polymer is used in conjunction with a dispersing sulfonated polymer and surfactant. This highly effective combination is then adjusted to individual well conditions with chelating agent, cross-linking agent, biocides, antifoams, or combinations of these. The dispersants are novel dispersing agent polymers such as melamine sulfonate polymer, vinyl sulfonate polymer and styrene sulfonate polymer and mixtures of these. These dispersant materials are usually prepared at low pH and can be used in the acid form, or neutralized to form salts of the polymers, wherein the salt can be a Group I or Group II metal salt, or ammonium salts (common salts).

14 Claims, No Drawings

COMPOSITION AND METHOD TO CONTROL CEMENT SLURRY LOSS AND VISCOSITY

RELATED APPLICATIONS

This application is a continuation-in-part of application Ser. No. 08/581,090, filed Dec. 29, 1995, entitled "Composition and Method to Control Cement Slurry Loss and Viscosity", now abandoned.

BACKGROUND OF THE INVENTION

1. Field of the Invention

This invention relates generally to cementing casing strings in oil and gas wellbores. The invention deals with cementing compositions and cementing methods using an additive package which achieves a low fluid loss cement composition during placement of the cement around the casing string in the wellbore.

2. The Prior Art

Polyvinyl alcohols, including polyvinyl alcohol/polyvinyl acetate polymers have been used for fluid loss control in the past. Use is illustrated in U.S. Pat. No. 5,009,269 to Moran et al. A detailed description of polyvinyl alcohol chemistry is found in U.S. Pat. No. 4,569,395 to Carpenter. Other fluid loss additives which are known to the prior art include cellulosic materials, polysaccharides, polyacrylamides, polyvinyl alcohol, polymethacrylates, polyamides, and polyvinyl pyrrolidone.

U.S. Pat. No. 4,011,909 discloses a well cement slurry including borax and polyvinyl alcohol which improves the flow properties of the cement. U.S. Pat. No. 2,576,955 discloses a low water loss cement slurry containing polyvinyl alcohol, boric acid and tributyl phosphates. Boric acid is utilized as a retarder.

In addition, various surfactants have been used in cementing slurries, mainly to reduce air entrainment as illustrated by U.S. Pat. No. 4,351,671 in which invention an ethoxylated nonyl phenol is used in a cement slurry to reduce air entrainment.

U.S. Pat. No. 5,105,885 shows the use of polyvinyl alcohol in combination with a variety of surfactants and the salt of naphthalene sulfonic acid condensed with formaldehyde.

None of the above-described references, whether considered singly or together, discloses how to produce a liquid fluid loss additive produced from polyvinyl alcohol. Further, none of the above-identified references discloses the use of salts of condensed melamine sulfonate, salts of condensed styrene sulfonate, salts of condensed toluene sulfonate or polyvinyl copolymer sulfonates to aid in reducing slurry viscosity and improving fluid loss control.

As disclosed in U.S. Pat. No. 5,009,269 the ideal fluid loss additive has a low cost and has no adverse effects on performance properties of the cement in which it is placed. For a cement slurry to seal the annulus it must be effectively inserted between the casing string and the wellbore throughout the formation, then change from a liquid to a solid in the annulus.

Polyvinyl alcohol/polyvinyl acetate polymers are popular as cement fluid loss additives because they do not retard the setting of the concrete. Polyvinyl alcohol/polyvinyl acetate polymers are also relatively inexpensive but have several shortcomings. For example, the cement slurries containing polyvinyl alcohol/polyvinyl acetate can be viscous, which increased viscosity hinders the placement of the cement slurry properly in the annulus. Simple dilution is not effective in many situations where cement density must be maintained. Increased viscosity causes increased friction pressure when the cement is being pumped down the well and back up inside the annulus. Excessive friction pressure can cause many problems, one of which is that the formation rock is separated and cement is forced into the formation instead of up the annulus between the wellbore in the formation and the casing string which is to be cemented in the wellbore. Another problem is that polyvinyl alcohol/polyvinyl acetate polymers, have not been formulated as liquid fluid loss additives. It is desirable to have a liquid fluid loss additive since in most offshore applications it is preferable that the additive be added to the cement mix water, instead of having a powdered fluid loss additive that is blended with a dry powder cement. The problem is magnified since transportation is always a problem offshore, and when cement containing no additives can be stored on the drilling rig, and all required additives placed in the mix water, a great deal of inventory trouble is avoided.

SUMMARY OF THE INVENTION

Under the present invention, we have now developed a liquid fluid loss additive which incorporates polyvinyl alcohol as the base polymer. The liquid fluid loss additive is formed from dissolving partially hydrolyzed polyvinyl alcohol in water. A cross-linker, chelating agent, surfactant, defoamer, sulfonated dispersant, and bactericide can also be dissolved in the water where use of such materials is indicated. This liquid solution is then added to the cement mix water. The resulting cement slurry will have excellent fluid loss control. The liquid solution can be used in conjunction with additional sulfonated polymer dispersing agents to achieve lower viscosity cement slurries. The sulfonated polymer dispersing agents also increase the effectiveness of the liquid solution as a fluid loss agent.

A further embodiment of the present invention provides a powdered fluid loss additive for direct addition to powdered cement which utilizes polyvinyl alcohol, surfactant, boric acid, antifoam agent, and sulfonated polymer dispersing agent to give a low viscosity, low fluid loss cement slurry.

DESCRIPTION OF THE PREFERRED EMBODIMENT

Known polyvinyl alcohol fluid loss additives have a molecular weight of about 200,000 for the polyvinyl alcohol. The polyvinyl alcohol usually has about 88 percent of the acetate groups hydrolyzed and also contains a cross-linking ion, of which borate ion is most preferred. The borate ion increases the upper temperature limit for which polyvinyl alcohol will control fluid loss. The fluid loss additive also contains calcium sulfate, the calcium sulfate hemihydrate form of which is preferred. The calcium sulfate hemihydrate allows polyvinyl alcohol to control fluid loss at low temperatures (below 125° F.) in cement slurries mixed with fresh water. Optionally, defoamers can be used because polyvinyl alcohol has a tendency to foam in cement slurries.

The present invention provides an improvement to the known powdered polyvinyl alcohol based well cement fluid loss additives by the addition of a surfactant and a sulfonated polymer dispersing agent to reduce the viscosity of the resulting slurry. U.S. Pat. No. 5,105,885 describes adding a variety of surfactants and naphthalene sulfonate that has been condensed with formaldehyde to polyvinyl alcohol to obtain the fluid loss additive. The present invention utilizes the surfactants described in U.S. Pat. No. 5,105,885, together with a dispersing agent selected from the group consisting of melamine sulfonate polymer, vinyl sulfonate polymer, styrene sulfonate polymer, the common salts of these polymers and mixtures of these, together with from 30 to 80 percent by weight of partially (at least 70 percent) hydrolyzed high molecular weight vinyl acetate polymer to produce a fluid additive which will make a thinner, less viscous cement slurry. Examples of common salts of the sulfonated polymers are sodium, potassium, lithium, calcium, magnesium, ammonium salts or mixtures of these. The combination of surfactant and sulfonated polymer provides ease of placement of the cement slurry and does affect the excellent fluid loss control provided by vinyl acetate polymers.

The present invention can also be practiced as a liquid fluid loss additive for addition to cement mix water, having particular utility in offshore applications. The liquid fluid loss solution contains polyvinyl alcohol dissolved in water, a small amount of the acid form of sulfonated dispersing agent (melamine sulfonate polymer, vinyl sulfonate polymer, or styrene sulfonate polymer) or the neutralized salt, where the salt is a Group I or Group II metal salt, or ammonium salt (herein referred to as common salts), surfactant as described in U.S. Pat. No. 5,105,885, and as needed, a crosslinking agent, chelating agent, bactericide, and antifoam. Fluid loss control can be further improved with the addition of extra dispersing agent consisting of melamine sulfonate polymer, vinyl sulfonate polymer, styrene sulfonate polymer, the common salts of each, and mixtures of these as a partial replacement for mix water. Addition of extra sulfonated polymer also reduces the viscosity of the resulting slurry, and is useful in wells where extremely low viscosity is needed.

Dry Mix Fluid Loss Additives

The cement additive composition is prepared by dry mixing the various materials and can be described as follows, comprising by weight:

(a) 30 to 90 parts polyvinyl acetate polymer,
(b) 1 to 40 parts of nonionic surfactant,
(c) 1 to 40 parts of a dispersant material selected from the group consisting of melamine sulfate polymer, vinyl sulfonate polymer, styrene sulfonate polymer, and mixtures of these.

Most additives, in addition to the basic mixtures, will also contain:

(d) 0 to 60 parts calcium sulfate hemihydrate, and
(e) 0.5 to 2 parts of polyglycol antifoam material, and such addition is preferred but not critical.

Variations in the degree of hydrolysis of the polyvinyl alcohol, the molecular weight of the polyvinyl alcohol, and the inclusion of up to 10 percent by weight of substituents on the polyvinyl alcohol, such as methacrylate, methmethacrylate and the like are within the scope of the present invention. In addition, the preferred embodiment can contain calcium sulfate in a form such as dihydrate or anhydrite, but present in an amount equivalent to from 0 to 60 percent by weight of calcium sulfate hemihydrate.

The formulation can further contain from 0.1 to 15 parts of borate cross-linking agent from any water-soluble borate source such as sodium tetraborate, potassium tetraborate, boric acid, boron oxide, or calcium hexaboride, and the like. Titanate and zirconate cross-linking agents can be used as full or partial substitutes for the water-soluble borates, but are not as preferred.

The surfactant can be any of a wide range of materials such as ethoxylated alkyl phenols, ethoxylated primary or secondary alcohols, ethoxylated fatty alcohols, ethoxylated amines, ethoxylated amides, ethoxylated fatty acids, ethoxylated diamines, and ethoxylated quaternary ammonium chlorides. Suitable surfactants are described in detail in U.S. Pat. No. 5,105,885.

Antifoam materials useful in the present invention are usually polypropylene glycols but any suitable substitute can be utilized.

Cement retarding additives can also be added to the fluid loss additives. At temperatures above 80° F., cement sets in a short period of time. Retarders, such as lignosulfonate materials, lengthen the time the cement slurry will stay liquid, allowing the slurry to be pumped down the casing and back up the annulus before setting. Without retarders, cement could not be used in deep wells that have high bottom hole temperatures.

The sulfonated polymer dispersing agents of the present invention can be any of a number of materials such as sulfonated polymelamine, sulfonated polystyrene or vinyl sulfonate polymers or mixtures of these. Other sulfonated polymer materials can be substituted provided that materials can be prepared at low pH and neutralized to form salts of the polymers. The salts can be sodium, potassium, lithium, ammonium, calcium, magnesium, and the like. The sulfonated polymer is added in a quantity of 0.05 to 2.0 percent by weight of the cement. These sulfonated polymers are available in liquid or powdered form. The weight percent specified is based on sulfonated polymer only and does not include the weight of any water that may be present in the liquid form.

For low temperature versions of the fluid loss additive (for use at temperatures under 125° F.) the cross-linking agent can be omitted from the formulation. Also, the sulfonated polymer in the additive allows the additive to control fluid loss at low temperatures without the need for calcium sulfate. However, even for low temperature applications, calcium sulfate can be contained in the dry additive, if desired.

In preparing the low viscosity dry mixed fluid loss control additive of the present invention, the components to the cement can be added as a single blend, or as individual components, or in any combination or order of addition.

A most preferred dry mix fluid loss control and low viscosity additive has the following composition, where PVA indicates polyvinyl acetate and MW indicates molecular weight:

TABLE 1

| INGREDIENT | PERCENT BY WEIGHT |
|---|---|
| 88 Percent Hydrolyzed PVA (190,000 MW) | 60 |
| Surfactant | 20 |
| Boric Acid | 1 |
| Defoamer | 1 |
| Sulfonated Melamine Polymer (MW 5,000–20,000) | 18 |

Liquid Fluid Loss Additives

A second embodiment of the present invention is the development of a liquid fluid loss additive containing polyvinyl alcohol. Although polyvinyl alcohol is soluble in water, at times the water must be heated. When polyvinyl alcohol/polyvinyl acetate polymers, having nearly 100 percent of the acetate groups converted to alcohol groups, are dissolved in water at concentrations above about 3 percent by weight of water, excessive gelation occurs with time. For a liquid fluid loss additive to be useful, such additive must pour easily and not gel. To prevent gelation, the preferred polyvinyl alcohol is hydrolyzed to from 70% to 95% by weight, and most preferably is an 88% hydrolyzed material. However, most of the polyvinyl alcohol polymers contain various molecular weights and degrees of hydrolysis, and such combinations of these polymers in solution will control fluid loss in the present invention.

A liquid fluid loss additive composition for addition to the cement mix water is described as follows, comprising by weight:

(a) 1000 parts water, (b) 20 to 200 parts of polyvinyl acetate polymer with at least 70 percent of the acetate groups converted to alcohol groups, (c) 0.1 to 100 parts surfactant, (d) 1.0 to 200 parts of a sulfonated melamine polymer, sulfonated vinyl polymer, a sulfonated styrene polymer, their common salts, and/or combinations of these.

Preferably, but not critically, the liquid fluid loss additive will contain in addition one or more of the following:

(e) 0.1 to 50 parts water soluble boron-containing material where the preferred material is boric acid, (f) 0.1 to 50 parts of a biocide to prevent bacterial degradation of the polymer solution over time, (g) 0.5 to 50 parts of chelating agent where the preferred material is ethylenediaminetetraacetic acid tetrasodium salt.

(h) 0.1 to 50 parts of antifoam agents selected from the group consisting of polyglycols and silicones, The biocide is preferably but not critically added to the fluid loss additives of the present invention. Although any water soluble biocide can be used, the fluid loss additives of present invention have successfully used KATHON LX (a trademark of Rohm and Haas Corporation) which is chemically 5-chloro-2-methyl-4-isothiazolin-3-one. The biocide is present to prevent the liquid from degrading due to bacterial action.

The liquid loss additive contains a surfactant selected from a wide range of materials such as ethoxylated alkyl phenols, ethoxylated primary or secondary alcohols, ethoxylated fatty alcohols, ethoxylated amines, ethoxylated amides, ethoxylated fatty acids, ethoxylated diamines, and ethoxylated quaternary ammonium halides. The surfactant prevents viscosity fluctuations in the cement slurry caused by interactions between the sulfonated polymer salts and the polyvinyl alcohol.

The antifoam is present because cement slurries containing polyvinyl alcohol polymer will foam and foam hinders mixing of the cement slurry.

The crosslinker is present to enhance fluid loss control as described in U.S. Pat. No. 5,009,269.

Chelating agents useful in the present invention are ethylenediaminetetraacetic acid (EDTA), nitrilotriacetic acid (NTA), triethanolamine (TEA), triethanolamine borate (TEAB), 2,3-butanedione dioxime, 1,2-dihydroxyanthraquinone, and the Group I and ammonium salts of these.

The chelating agent performs two functions. The chelating agent allows a small amount of dispersant to be part of the liquid fluid loss additive without increasing the viscosity of the liquid fluid loss additive. The chelating agent also prevents the cement slurry from becoming excessively thin when additional dispersant is added. Cement slurries which are excessively thin will settle and allow separation of cement solids and water from the cement slurry during the time when the cement slurry is static and has not set in a well. Such separation is not desirable and adversely affects the quality of the cementing.

A sulfonated polymer or polymer salt in the above described liquid enhances fluid loss control and reduces the viscosity of the resulting cement slurry.

Cement retarding additives can also be used in conjunction with the liquid fluid loss additive or liquid fluid loss additive and sulfonated polymer combination. Cement at temperatures above 80° F. sets in a short period of time. Retarders, such as lignosulfonate materials, lengthen the time the cement slurry will stay liquid allowing the slurry to be pumped down the casing and back up the annulus before setting. Without retarders, cement could not be used in deep wells that have high bottom hole temperatures.

A most preferred liquid fluid loss control additive composition is set forth below:

TABLE 2

| INGREDIENT | PERCENT BY WEIGHT |
| --- | --- |
| Water | 91.56 |
| 88 Percent Hydrolyzed PVA (M.W. 190,000) | 7.28 |
| Sodium Salt of Melamine Sulfonate Polymer (MW 5000–25,000) | 0.70 |
| Boric Acid | 0.01 |
| Surfactant | 0.08 |
| Biocide | 0.02 |
| Antifoam | 0.20 |
| Ethylenediaminetetraacetic Acid Tetrasodium Salt | 0.24 |

The 88% hydrolyzed polyvinyl alcohol with a molecular weight of about 190,000 is useful for both the dry mix and liquid fluid loss control additive.

Fluid loss control additives, both dry and liquid, have been tested in a variety of cement systems and under a variety of conditions. Both additives have been found to provide excellent fluid loss control.

EXAMPLES

The present invention is illustrated by the following examples which are provided to illustrate the present invention and not to limit it. All parts and percentages are by weight unless otherwise specified.

In all the following examples, a cement which meets American Petroleum Institute specifications for a Class "H" cement was used.

The following examples demonstrate and compare three fluid loss additives.

Test 1 uses FloBloc® 210 cement additive (a registered trademark of Conoco Inc.) described in U.S. Pat. No. 5,009,269 to Moran et al. FloBloc® 210 cement additive is a polyvinyl alcohol based, commercially available, widely used cement fluid loss control additive.

Test 2 uses the most preferred dry mix low viscosity fluid loss additive of the present invention as described in Table 1.

Test 3 uses the most preferred liquid fluid loss additive of the present invention as described in Table 2.

Test 4 uses the most preferred liquid fluid loss additive of the present invention as described in Table 2, in conjunction with extra liquid melamine sulfonate polymer as a replacement for a portion of the mix water.

All tests were prepared according to API Specification 10 test procedures. The fluid loss and rheological (viscosity)

measurements were determined as per API Specification 10 for Cements and Additives. The rheometer used had a 1 rotor, 1 bob, and a normal spring. For test #1 and #2 the fluid loss additive was dry blended with the cement prior to the cement being mixed with water. For test #3 and #4 the fluid loss additive and sulfonated polymer are in the fresh water prior to the cement being mixed with the water containing the additives.

TABLE 3

SLURRY COMPOSITIONS FOR TESTS 1-4

| Test No. | Class H Cement (gms) | FloBloc ® 210 (gms) | Preferred Dry Mix (gms) | Preferred Liquid (gms) | Fresh Water (gms) | Additional Melamine Polymer (gms) |
|---|---|---|---|---|---|---|
| 1 | 800 | 8.0 | — | — | 304 | — |
| 2 | 800 | — | 8.0 | — | 304 | — |
| 3 | 800 | — | — | 53 | 251 | — |
| 4 | 800 | — | — | 53 | 249 | 2.0 |

TEST #1 @ 100° F.
Fluid Loss: 12 milliliters/30 minutes
Rheology:  300 rpm   200 rpm   100 rpm   6 rpm   3 rpm
           250       200       137       37      28
TEST #2 @ 100° F.
Fluid Loss: 6 milliliters/30 minutes
Rheology:  300 rpm   200 rpm   100 rpm   6 rpm   3 rpm
           134       86        49        7       6
TEST #3 @ 100° F.
Fluid Loss: 40 milliliters/30 minutes
Rheology:  300 rpm   200 rpm   100 rpm   6 rpm   3 rpm
           147       107       63        16      14
TEST #4 @ 100° F.
Fluid Loss: 16 milliliters/30 minutes
Rheology:  300 rpm   200 rpm   100 rpm   6 rpm   3 rpm
           123       78        40        5       3

The results show that the most preferred dry additive of Table 1 (Test 2) gives a lower fluid loss value and lower rheological values when compared to a commonly used commercially available polyvinyl alcohol based additive (Test 1).

The results also show that the liquid fluid loss additive controls fluid loss and has rheological properties similar to the slurry prepared with the most preferred dry mix additive (Test 3).

The results also show the advantages of adding extra sulfonated polymer to the liquid fluid loss additive. When extra sulfonated polymer is added with the liquid fluid loss additive better fluid loss control is achieved and the resulting slurry has less viscosity (Test 4).

As a standard for the excellent fluid loss control demonstrated by the present examples, the society of Petroleum Engineers in a monograph entitled "Cementing" by Dwight K. Smith on page 54 shows the fluid loss of a neat slurry to be greater than 1,000 milliliters every 30 minutes. This monograph is a 1990 version monograph, Volume 4 of the SPE, Henry L. Doherty series.

While certain embodiments and details have been shown for the purpose of illustrating this invention, it will be apparent to those skilled in this art that various changes and modifications may be made herein without departing from the spirit or the scope of the invention.

We claim:

1. A liquid cement additive composition comprising by weight:
    (a) 1000 parts of water,
    (b) 20 to 200 parts of polyvinyl acetate polymer wherein said polyvinyl acetate polymer has had at least 70% of its acetate functional groups converted to alcohol,
    (c) 0.1 to 100 parts surfactant,
    (d) 1.0 to 50 parts of salts of sulfonated melamine polymer, salts of sulfonated vinyl polymer, salts of sulfonated styrene polymer, or combinations thereof.

2. A composition as described in claim 1, further comprising from about 0.1 to about 50 parts of an antifoam agent selected from the group consisting of polyglycols and silicones.

3. A composition as described in claim 1 wherein a water soluble borate source is present in an amount of from about 0.1 to about 50 parts.

4. A composition as described in claim 3 wherein the water soluble borate source is selected from the group consisting of boric acid, sodium tetraborate, calcium hexaboride, potassium tetraborate, and mixtures thereof.

5. A composition as described in claim 4 wherein the water soluble borate source is boric acid.

6. A composition as described in claim 3 wherein the water soluble borate is replaced with crosslinking agents selected from the group consisting of titanate, zirconate and combinations thereof.

7. A composition as described in claim 1, further comprising from about 0.5 to about 50 parts chelating agent.

8. A composition as described in claim 7 wherein the chelating agent is selected from the group consisting of ethylenediaminetetraacetic acid (EDTA), nitrilotriacetic acid (NTA), triethanolamine (TEA), triethanolamine borate (TEAB), 2,3-butanedione dioxime, 1,2-dihydroxyanthraquinone, Group I metal salts of EDTA, and NTA and ammonium salts of EDTA, and NTA, and mixtures thereof.

9. A dry cement additive composition comprising, by weight:
    (a) 30 to 90 parts polyvinyl acetate polymer wherein said polyvinyl acetate polymer has had at least 70% of its acetate functional groups converted to alcohol,
    (b) 1 to 40 parts of a dispersant material selected from the group consisting of melamine sulfonate polymer, vinyl sulfonate polymer, styrene sulfonate polymer, and mixtures thereof, and
    (c) 1 to 40 parts of surfactant.

10. A composition as described in claim 9, further comprising from 0.1 to 60 parts calcium sulfate hemihydrate.

11. A composition as described in claim 9, further comprising from 0.5 to 2 parts of polyglycol antifoam material.

12. A composition as described in claim 9, further comprising from 0.1 to 15 parts of cross-linking agent, wherein the cross-linking agent is a water soluble borate source.

13. A composition as described in claim 12 wherein the water soluble borate source is selected from the group consisting of boric acid, sodium tetraborate, calcium hexaboride, potassium tetraborate, and mixtures thereof.

14. A composition as described in claim 12 wherein the water soluble borate source is replaced with water soluble crosslinking agents selected from the group consisting of borates, titanates, zirconates and mixtures thereof.

* * * * *